(No Model.)
H. SCHUPPISSER.
AXLE BOX FOR CARRIAGE WHEELS.
No. 543,320. Patented July 23, 1895.
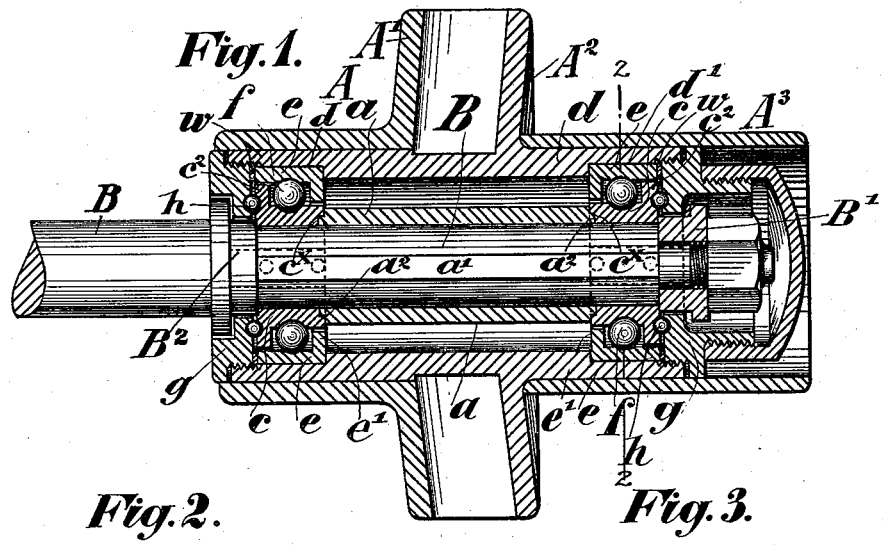
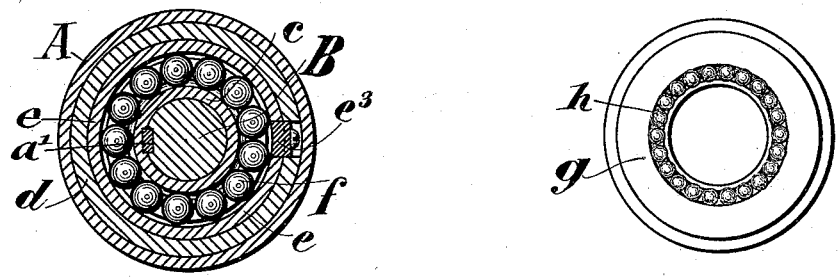
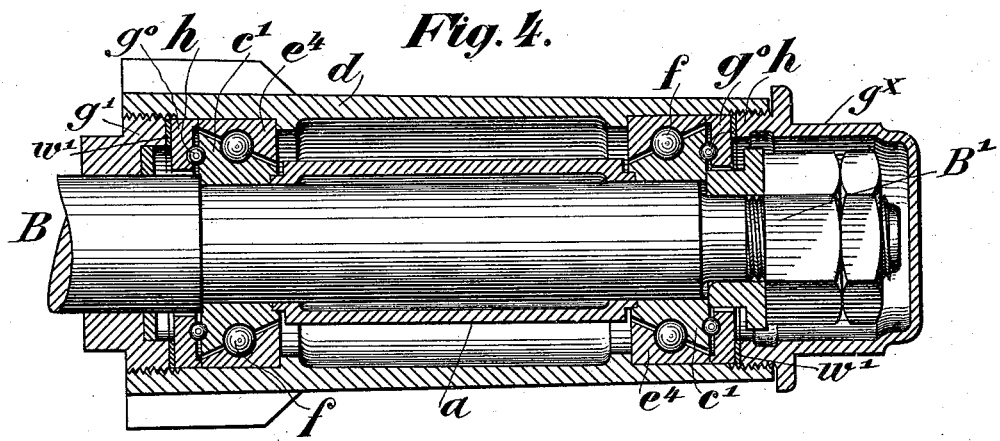
Witnesses:
George W Jackel
Geo. L. Wheelock
Inventor:
Hermann Schuppisser
BY
Attorneys.

UNITED STATES PATENT OFFICE.

HERMANN SCHUPPISSER, OF ZURICH, SWITZERLAND, ASSIGNOR TO KUGLER & CO., OF SAME PLACE.

AXLE-BOX FOR CARRIAGE-WHEELS.

SPECIFICATION forming part of Letters Patent No. 543,320, dated July 23, 1895.

Application filed October 29, 1894. Serial No. 527,282. (No model.)

*To all whom it may concern:*

Be it known that I, HERMANN SCHUPPISSER, a citizen of the Republic of Switzerland, residing at Zurich, Switzerland, have invented certain new and useful Improvements in Axle-Boxes for Carriage-Wheels, of which the following is a specification.

My invention relates to improvements in axle-boxes for carriages, wagons, &c., in which both the radial pressure as well as the axial thrust is taken up by ball-bearings, and consequently a rolling and not a sliding friction takes place. At the same time the ball-bearings are always so separated that neither the one nor the other of such pressures can ever fall at the places where the bearings have their joints.

My invention consists of certain features of construction and combinations of parts to be hereinafter described, and then pointed out in the claims.

In the accompanying drawings, Figure 1 is a longitudinal section of an axle-box constructed according to the principal form of my invention. Fig. 2 is a cross-section on the line 2 2 of Fig. 1. Fig. 3 is an inner face view of one of the setting-rings, showing the auxiliary series of balls arranged in the groove therein; and Fig. 4 is a longitudinal section of a modified form of the invention.

Similar letters of reference indicate corresponding parts.

In Figs. 1, 2, and 3, A indicates the hub of a wheel, which hub is composed of flange-sections $A'$ and $A^2$, which, when fitted one over the other, provide the sockets for the spokes. $A^3$ is the hub-band, which is inserted over the outwardly-projecting portion of the nave of the main hub-section $A^2$. Keyed in the internal annular recesses $d'$ at opposite ends of the cylindrical nave portion $d$ of the hub are rings $e$ of hard steel, which are provided with inner annular flanges $e'$, said flanges extending inwardly. The wheel-axle B is provided at its outer end with a screw-threaded portion, which receives the nuts $B'$, which nuts and the enlarged annular flange $B^2$ at the inner portion of the axle confine a sleeve $a$ through the medium of rings $c\ c$, placed between the sleeve $a$ and the flange $B^2$ and nuts, respectively. The sleeve $a$ and the rings $c$ are prevented from rotation on the axle by means of a key $a'$, and in order that the rings and the sleeves may be fitted snugly together, their meeting edges are respectively provided with annular grooves and shoulders $c^x$ and $a^2$. The rings $c$, which are fixed on the axle, are provided at their outer edges with outwardly-projecting flanges $c^2$, so that by said flanged rings $c$ and the flanged rings $e$, which are firmly attached to the nave proper of the hub, an annular space is formed at each end of the hub, each space containing a series of balls $f$, which balls are of hardened steel, the flanged rings $e$ and $c$ being likewise of hardened steel. The bearing-surfaces of the flanged rings $e$ and $c$ are slightly grooved at the points where the balls $f$ bear, so as to provide a larger surface of contact for the balls, and consequently reduce the pressure on the unit of surface as well as the wear and tear between the parts. In such a construction the joints between the rings permit, first, the radial pressure to be directed perpendicularly to the joint between the rings, and consequently they prevent the axial thrust from falling directly in the joint, the same being taken up by the annular flanges of said rings. The cylindrical nave portion $d$ of the hub is provided at each end beyond the affixed rings $e$ with internal screw-threads, so as to permit the screwing therein of the setting-rings $g$, which are approximately Z-shaped in cross-section. These setting-rings $g$ are provided on their inner surfaces with annular grooves, and the flanges $c^2$ of the annular rings $c$ are likewise provided with annular grooves, so that two series of auxiliary balls $h\ h$ may be held in said grooves between the contiguous surfaces of said parts. The balls $h$ serve especially to take up the horizontal thrust caused by the displacement of the wheel on the axle.

The auxiliary balls $h$ may be inserted through an opening in each nave portion $d$ and hub-ring $e$, as shown at the right of Fig. 2, which opening may be closed by a removable plug or closure $e^3$.

In Fig. 4, which shows a modification of my invention, the rings $c$ and $e$ of the main form are displaced by rings $c'$ and $e^4$, which are likewise fixed to the axle and to the hub, respectively. Said rings $c'$ and $e^4$ are, however, of a different form to the others, each partaking of a substantially triangular form in cross-section, so as to each substantially surround one-half of the balls $f$, the joint between the two rings being almost the diagonal of the square which said rings substantially present in cross-section. In place of the setting-rings $g$ of the principal form of the invention, I substitute in this form a setting-ring $g'$ and a cap $g^\times$, which press flat rings $g^\circ$ against the rings $c'$ $e^4$, said flat rings $g^\circ$ being, like the setting-rings $g$ of the main form, provided on their inner surfaces with annular grooves, so as to receive, in connection with the annular grooves of the rings $c'$, the two auxiliary series of balls $h$ $h$. The action of the parts described is substantially the same as in the present form of the invention. As the parts $c$, $e$, $e^4$, $c'$, $g$, and $g^\circ$ are separate from each other and not made in one piece with any of the other parts of the axle-box, they can be readily renewed when worn out.

In the several forms of the invention washers $w$ and $w'$ are respectively provided between the rings $e$ and $g$ and $g'$ and $g^\circ$.

Having thus described my invention, I claim as new and desire to secure by Letters Patent—

1. The combination, with an axle and rings rigidly fixed thereon, provided with peripheral grooves and with annular grooves in their outer faces, of a hub, rings fixed inside of the hub and provided with grooves registering with the peripheral grooves of the axle-rings, additional rings secured in the hub and provided with grooves in their inner flat faces registering with the grooves in the adjacent faces of the axle-rings, a series of balls received in the registering-grooves of the axle and hub-rings, and a series of auxiliary balls received in the registering-grooves of the axle rings and additional rings, substantially as set forth.

2. The combination, with an axle and triangular rings fixed thereon and provided with grooves in their ends and in their inclined outer faces, of a hub, rings fixed inside of the hub and provided with grooves in their inclined faces registering with the grooves of the axle-rings, additional rings secured in said hub and provided with grooves in their inner faces registering with the grooves in the ends of the axle-rings, a series of balls received in the registering grooves of the axle rings and hub-rings, and a series of auxiliary balls received in the registering grooves of the axle rings and additional rings, substantially as set forth.

In testimony whereof I hereunto sign my name, in the presence of two subscribing witnesses, this 4th day of October, 1894.

HERMANN SCHUPPISSER.

Witnesses:
 EMIL BLUM,
 JEAN SCHORT-FISCHER.